United States Patent
Danger et al.

(10) Patent No.: US 8,955,160 B2
(45) Date of Patent: Feb. 10, 2015

(54) METHOD FOR DETECTING ABNORMALITIES IN A CRYPTOGRAPHIC CIRCUIT PROTECTED BY DIFFERENTIAL LOGIC, AND CIRCUIT FOR IMPLEMENTING SAID METHOD

(75) Inventors: Jean-Luc Danger, Antony (FR); Sylvain Guilley, Paris (FR); Florent Flament, Paris (FR)

(73) Assignee: Institut Telecom-Telecom Paris Tech, Paris (FR)

( * ) Notice: Subject to any disclaimer, the term of this patent is extended or adjusted under 35 U.S.C. 154(b) by 216 days.

(21) Appl. No.: 13/058,706

(22) PCT Filed: Jul. 30, 2009

(86) PCT No.: PCT/EP2009/059886
§ 371 (c)(1),
(2), (4) Date: May 11, 2011

(87) PCT Pub. No.: WO2010/018071
PCT Pub. Date: Feb. 18, 2010

(65) Prior Publication Data
US 2012/0124680 A1    May 17, 2012

(30) Foreign Application Priority Data
Aug. 12, 2008  (FR) ...................... 08 55537

(51) Int. Cl.
*G06F 21/00*  (2013.01)
*G06F 21/55*  (2013.01)
*G06F 21/75*  (2013.01)

(52) U.S. Cl.
CPC .............. *G06F 21/558* (2013.01); *G06F 21/75* (2013.01)
USPC .......................................................... 726/34

(58) Field of Classification Search
CPC ......... G06F 21/75; G06F 21/73; G06F 21/76; G06F 21/71; G06F 21/558
USPC ...................................................... 726/34–36
See application file for complete search history.

(56) References Cited

U.S. PATENT DOCUMENTS 5,332,931 A * 7/1994 Crispie et al. ................... 327/67
5,825,878 A * 10/1998 Takahashi et al. ............. 713/190

(Continued)

FOREIGN PATENT DOCUMENTS

WO            01/55821 A      8/2001
WO        2005/085972 A      9/2005

OTHER PUBLICATIONS

Greub, Hans J. et al., "High-Performance Standard Cell Library and Modeling Technique for Differential Advanced Bipolar Current Tree Logic", IEEE Journal of Solid-State Circuits, 26(5):749-762, May 1991.*

(Continued)

*Primary Examiner* — Kambiz Zand
*Assistant Examiner* — Don Zhao
(74) *Attorney, Agent, or Firm* — Baker & Hostetler LLP

(57) ABSTRACT

In a method for detecting anomalies in a circuit protected by differential logic and which processes logic variables represented by a pair of components, a first network of cells carrying out logic functions on the first component of said pairs, a second network of dual cells operating in complementary logic on the second component, the logic functions being carried out by each pair of cells in a pre-charge phase placing the variables in a known state on input to the cells and followed by an evaluation phase where a calculation is performed by the cells, the method includes detecting an anomaly by at least one non-consistent state.

12 Claims, 5 Drawing Sheets

(56) References Cited

U.S. PATENT DOCUMENTS

| | | | |
|---|---|---|---|
| 6,337,821 B1* | 1/2002 | Watanabe et al. | 365/202 |
| 6,934,854 B2* | 8/2005 | Brucklmeier et al. | 726/34 |
| 7,506,165 B2* | 3/2009 | Kocher et al. | 713/194 |
| 7,587,044 B2* | 9/2009 | Kocher et al. | 380/1 |
| 7,634,083 B2* | 12/2009 | Kocher et al. | 380/1 |
| 7,941,666 B2* | 5/2011 | Kocher | 713/172 |
| 2002/0019925 A1* | 2/2002 | Dewhurst et al. | 712/9 |
| 2003/0218475 A1* | 11/2003 | Gammel | 326/8 |
| 2004/0236961 A1* | 11/2004 | Walmsley | 713/200 |
| 2005/0241005 A1* | 10/2005 | Kunemund | 726/36 |
| 2007/0171099 A1 | 7/2007 | Kuenemund | |
| 2008/0046683 A1* | 2/2008 | Codrescu et al. | 712/7 |
| 2010/0329446 A1* | 12/2010 | Degrendel et al. | 380/28 |

OTHER PUBLICATIONS

Wikipedia, the free encyclopedia, "Field-programmable gate array," http://en.wikipedia.org/wiki/Field-programmable_gate_array, last modified on Sep. 29, 2012. (printed Oct. 1, 2012).*

Gilles Piret et al., "A Differential Fault Attack Technique against SPN Structures, with Application to the AES and Khazad", CHES 2003, LNCS 2779, pp. 77-88, 2003.

Bruno Robisson et al., "Differential Behavioral Analysis", CHES 2007, LNCS 4727, pp. 413-426, 2007.

Peter Gutmann et al., "Finding Faults", Crypto Corner, Published by the IEEE Computer Society, 1540-7993, vol. 3, 2005.

* cited by examiner

METHOD FOR DETECTING ABNORMALITIES IN A CRYPTOGRAPHIC CIRCUIT PROTECTED BY DIFFERENTIAL LOGIC, AND CIRCUIT FOR IMPLEMENTING SAID METHOD

CROSS-REFERENCE TO RELATED APPLICATIONS

This application is a National Stage of International patent application PCT/EP2009/059886, filed on Jul 30, 2009, which claims priority to foreign French patent application No. FR 08 55537, filed on Aug. 12, 2008, the disclosures of which are incorporated by reference in their entirety.

FIELD OF THE INVENTION

The invention relates to a method and a circuit for detecting anomalies in a cryptography circuit protected by differential logic.

It is applied notably to the field of the protection of cryptography circuits against attacks by fault injection.

BACKGROUND OF THE INVENTION

The aim of cryptography is notably to protect:
either the secrecy of information by means of encryption and its dual operation, decryption;
or only its integrity, by the operations of signature and signature verification.

Cryptography uses mathematical methods that are secure, in the sense that in the current state of published knowledge there are no methods of attack faster than exhaustive attack corresponding to trying all possible keys.

In general, encryption methods involve complex calculations necessary for systems security. This complexity does not pose any particular problems to computers but it constitutes a drawback in the case of mass-market devices not comprising high calculation power, in general controlled by low-cost microprocessors. The consequences may then be of several kinds, thus for example a bank card would take several minutes to sign a transaction or a pay-per-view television digital decoder might not follow the throughput of information involved.

To alleviate this type of problem without increasing the price of systems, it is customary to append an aid to the central unit controlling the device, in general in the form of a coprocessor dedicated to cryptography.

However, whether it is implemented by the central unit or by a specialized coprocessor, the cryptography algorithm is in all cases implemented by a physical, electronic device. Electronic devices exhibit inevitable imperfections related to the inherent properties of the laws of electricity.

Thus, cryptographic systems which are secure from the mathematical point of view may be attacked by utilizing the imperfections of the physical systems implementing the algorithm. The duration of the calculations may depend on the values of the data, in particular on time-optimized software systems, and this may give rise to attacks of "timing attack" type making it possible in certain cases to retrieve all the secret keys on the basis of simple measurements of execution time. The instantaneous electrical consumption may also depend on the data, and this may give rise to series of attacks such as:

SPA (Simple Power Analysis) which attempts to differentiate the operations executed by a central unit on the basis of a measurement of its electrical consumption measured during a cryptographic operation;

differential analysis of consumption DPA (Differential Power Analysis) which uses statistical operations on numerous measurements of electrical consumption, which are performed during cryptography operations on random messages and with a constant key to validate or invalidate an assumption made on a limited part of the key;

attacks of "template" type which in a first phase use a device identical to the attacked device, except that this identical device does not contain any secret, to construct consumption models indexed by the value of a limited part of the key and in a second phase use a few measurements of consumption of the attacked device to determine the model whose measured consumptions are the closest and thus determine the value of this sub-key.

Moreover, any electrical current flowing in a conductor engenders an electromagnetic field, measurement of which can give rise to attacks identical in principle to attacks pertaining to electrical consumption, notably by DPA.

Finally, so-called active attacks, or fault injection attacks, disturb the operation of systems so as to utilize the false results to retrieve the system's secrets.

Any imperfection of a physical device implementing a cryptography algorithm and liable to leak information related to the secrets held in the memory of the device is called a "hidden channel".

Fault attacks are active attacks that may be very different in nature, as explained notably in the article by David Naccache "Finding faults", IEEE Security and Privacy, 3 (5), pages 61-65, 2005: temperature or voltage variation, strong spurious signal on the power supply or by electromagnetic field, laser firings, etc. The consequence of the faults generated is to modify the value of a node of the attacked circuit. They may be single or multiple, permanent or transient depending on the impact on silicon. The flexibility of transient fault injections gives rise to more powerful attacks by making multiple tries and thus increases the chances of success. Attacks with single faults simplify the attack procedure. Fault attacks are based on differential analysis between the non-erroneous encrypted output and the output with fault. For example, the attack presented in the article by Gilles Piret and Jean-Jacques Quisquater "A Differential Fault Attack Technique against SPN Structures, with Application to the AES and KHAZAD", in CHES, volume 2779 from LNCS, pages 77-88, Springer, 2003 on AES encryption turns out to be extremely effective if the fault arrives at the penultimate or at the antepenultimate round.

Fault injection attacks have, hitherto, and very paradoxically, been considered to be expensive, and therefore accessible in practice solely to financially strong suspicious organizations. It is now possible to order on the Internet a decapsulation station and a turnkey tunable laser bench. It follows from this that the likelihood of an attack by fault injection is considerably increased. Thus, a cryptoprocessor implanted in an integrated circuit, for example an FPGA, can only henceforth be considered secure if it simultaneously implements countermeasures to observation attacks, notably of DPA or EMA types, and attacks of fault injection type. Moreover, attacks combining observation and faults have been proposed, like that described by Bruno Robisson and Pascal Manet in their article "Differential Behavioral Analysis", in CHES, volume 4727 from LNCS, pages 413-426, Springer, 2007.

An effective countermeasure for combating this type of attack relies on employing redundancy. For example, a calculation block may be reproduced three times and a majority function thereafter makes it possible to eliminate the block where a fault is injected. One of the drawbacks of this solution is that it involves an additional cost due to the reproduction of the calculation block or blocks or else to the insertion of a consistency checking module based on verification of invariants.

Another countermeasure consists in detecting fault injection. In this case the user is alerted and can act to protect himself, by reinitializing the system for example.

SUMMARY OF THE INVENTION

An aim of the invention is notably to alleviate the aforementioned drawbacks.

For this purpose the subject of the invention is a method for detecting anomalies in a circuit protected by differential logic and which processes logic variables represented by a pair of components, a first network of cells carrying out logic functions on the first component of said pairs, a second network of dual cells operating in complementary logic on the second component, the logic functions being carried out by each pair of cells in a pre-charge phase placing the variables in a known state on input to the cells and followed by an evaluation phase where a calculation is performed by the cells. An anomaly is detected by at least one non-consistent state arising during the pre-charge phase or during the evaluation phase.

The circuit protected by differential logic is for example a cryptography circuit.

According to one aspect of the invention, a logic gate is used for the detection of non-consistent states arising during the pre-charge phase, this logic gate being an "OR" gate if the consistent state is (0,0) or an "AND" gate if the consistent state is (1,1).

The logic gate used for the detection of non-consistent states arising during the evaluation phase may be an "XNOR" gate.

A multiplexer makes it possible for example to select the signal resulting from the detection of non-consistent states, the output of the gate for detecting non-consistent states in the pre-charge phase being selected during the pre-charge phase and the output of the gate for detecting non-consistent states in the evaluation phase during the evaluation phase, the selection being controlled by a configuration signal.

The subject of the invention is also a circuit protected by differential logic which processes logic variables represented by a pair of components, a first network of cells carrying out logic functions on the first component of said pairs, a second network of dual cells operating in complementary logic on the second component, the logic functions being carried out by each pair of cells in a pre-charge phase placing the variables in a known state on input to the cells and followed by an evaluation phase where a calculation is performed by the cells, said circuit being characterized in that it comprises at least one detection module implementing the method as claimed in one of the preceding claims and comprising means for testing the consistency between the two components of the logic variables during the pre-charge or evaluation phases at the monitored nodes of the circuit.

The circuit is for example a programmable circuit of FPGA type or else a circuit of ASIC type.

At least one of the detection modules comprises, for example, means for detecting the non-consistent states during the pre-charge phase on output from the cells to be monitored.

At least one of the detection modules comprises, for example, means for detecting the non-consistent states during the evaluation phase on output from the cells to be monitored.

The outputs of the detection modules may be collected by chaining, the results being centralized on at least one equipotential by way of "OR" gates.

The output of each detection chain may be connected to a flip-flop triggered by the clock signal and generating a global output taking the value 1 when at least one non-consistent state is detected by one of the detection modules of the chain.

By way of example, at least part of the circuit detection modules may be organized as a tree, the last detection module generating a global signal indicating whether at least one non-consistent state has been detected at one of the circuit nodes monitored by said modules.

The pairs of components to be monitored can, for example, be grouped together by vectors, the detection modules being composed of two multiplier-accumulators carrying out multiplication-accumulation operations between the vectors after a low-order bit of value 1 has been appended to each of said vectors, the difference between the results of the two operations being calculated and then processed by a zero comparator whose output takes the value zero when a non-consistent state is detected in the pre-charge or evaluation phases.

The output of the zero comparator of the detection modules is for example connected to a flip-flop so as to generate a stable output, as a result of the detection of non-consistent states.

The invention notably has the advantage of relying on the characteristics of the circuits protected by virtue of a countermeasure based on differential logic, initially designed to combat attacks by observation of hidden channels so as to detect other types of attacks or disturbances.

BRIEF DESCRIPTION OF THE DRAWINGS

Other characteristics and advantages of the invention will be apparent with the aid of the description which follows, given by way of nonlimiting illustration, offered with regard to the appended drawings among which.

DETAILED DESCRIPTION

Figure 1:
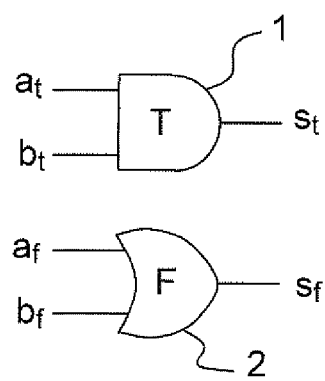
FIG. 1 represents an "AND" gate in differential logic.

FIG. 1 presents an "AND" gate 1, 2 in WDDL logic (Wave Dynamic Differential Logic) as an exemplary illustration of the principle of differential logic. The latter is composed of two dual logic networks 1, 2, operating under complementary logic. The example of WDDL logic is used in the subsequent description, but the principle of the invention applies to other types of differential logic, such as for example MDPL logic (Masked Dual-rail Pre-charge Logic). In addition to the duality of the calculation networks, a differential-logic calculation is performed as claimed in two distinct phases: a pre-charge phase and an evaluation phase.

The data are represented in dual rail, each logic variable a being formed of a pair of signals ($a_t$, $a_f$) coded in the following manner:
- (0, 0) for the quiescent state during the pre-charge phase: the value of a is not defined, it is denoted Ω;
- (1, 0) is an active state during the evaluation phase where a=1;
- (0, 1) is the other active state during the evaluation phase where a=0.

A logic gate H has two inputs a and b and an output s is physically represented by two gates 1, 2 having respectively the logic functions T ($a_t$, $b_t$) and F($a_f$, $b_f$) such that:

$$s_t = T(a_t, b_t) \quad (1)$$

$$s_f = F(a_f, b_f) \quad (2)$$

The "true" logic network corresponds to the function T which delivers the signal $s_t$. The "false" dual logic network corresponds to the function F which delivers the dual signal $s_f$. FIG. 1 illustrates the "AND" gate where the "true" network carrying out the function T receives the two non-complemented inputs $a_t$ and $b_t$. The dual "OR" function carries out the function F. For a vector of variables x the following relations are satisfied:

$$T(x) = H(x) \quad (3)$$

$$F(\overline{x}) = \overline{H(x)} \quad (4)$$

Figure 2:
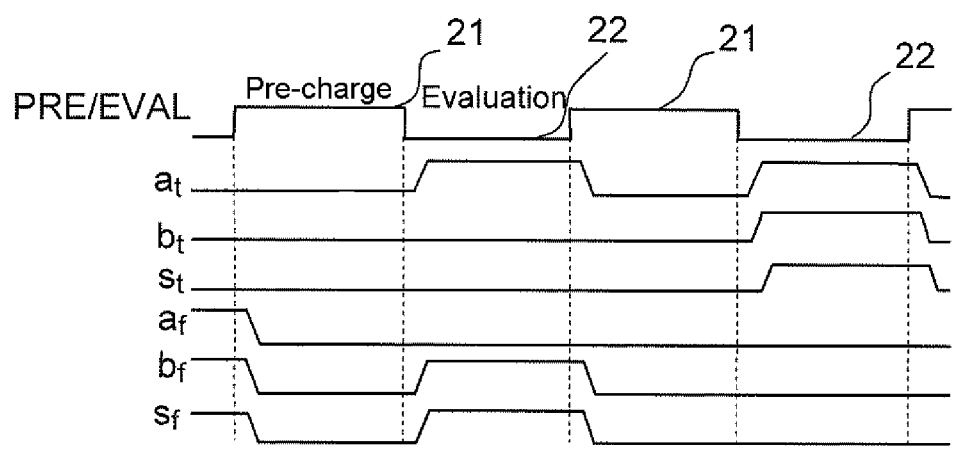
FIG. 2 illustrates the phases of a calculation step in differential logic.

FIG. 2 presents the phases of a calculation step using differential logic, for example of the WDDL type. This step comprises successive pre-charge 21 and evaluation 22 phases. Examples of states of the input variables $a_t$, $b_t$, $a_f$, $b_f$ and of the corresponding output variables $s_t$, $s_f$ are presented opposite the pre-charge and evaluation phases. The time-charts of FIG. 2 show that the number of transitions is the same, three in this instance, on switching from the pre-charge phase to the evaluation phase and vice-versa. As consumption is directly related to the number of transitions in electronic technologies of CMOS type notably, the consumption is thus balanced.

Figure 3:
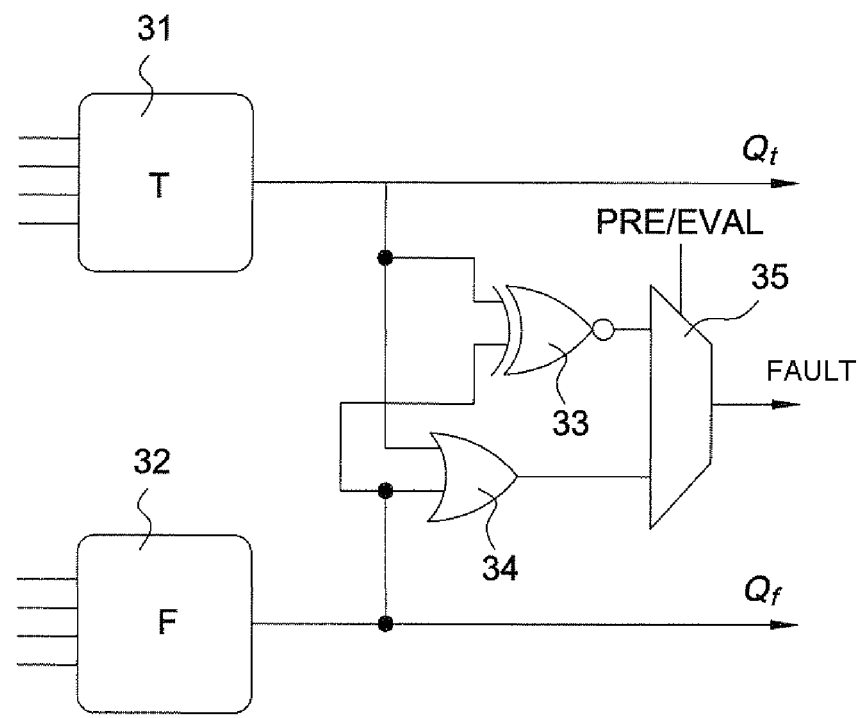
FIG. 3 illustrates the operating principle of the detection of anomalies relying on an architecture protected by differential logic.

FIG. 3 illustrates the operating principle of the detection of anomalies relying on an architecture protected by differential logic.

The differential logic dubbed dual rail is redundant by nature. Indeed, a variable in the logic state involves a signal "True" whose value is complementary to the signal "False" during evaluation and identical during pre-charge. Consequently an anomaly may be detected when non-consistent states arise, that is to say states which are not supposed to exist. For example in WDDL logic, an anomaly is detected if a non-consistent state is detected, that is to say:
- during the pre-charge phase the pair of dual signals is different from the state ($Q_t$, $Q_f$)=(0, 0);
- during the evaluation phase the pair of signals is different from the states ($Q_t$, $Q_f$)=(0, 1) or ($Q_t$, $Q_f$)=(1, 0).

Moreover, a single fault in differential logic has a probability of ½ of having an impact since the switch from dual-rail to single-rail logic is made by considering only a single signal out of the two components of a variable.

In the case of multiple faults, the proposed detection mechanism might not detect conjugate changes of state, such as for example (0, 1) which may be transformed into (1, 0) during the evaluation phase. This typical case is however very improbable since:
- the pre-charge state has a significant chance of being affected,
- in the case of multiple faults, other variables may be altered and detected,
- most attacks do not make it possible to do a bit inversion concomitantly on both signals. For example, attacks based on violation of prior positioning time by using the temperature, the voltage or the frequency.

The example of FIG. 3 illustrates the principle of a WDDL differential gate having a mechanism for detecting anomalies.

In order to carry out this detection function, an "OR" gate 34 carrying out the logical addition operation makes it possible to detect the non-consistent states at the output of the networks T 31 and F 32 during the pre-charge phase. Thus, when the states (0,1), (1,0) or (1,1) appear, the output of the "OR" gate 34 equals 1.

In the same manner, an "XNOR" gate 33 carrying out the inverse exclusive or operation makes it possible to detect the non-consistent states at the output of the networks T 31 and F 32 during the evaluation phase. Thus, when the states (0,0) or (1,1) appear, the output of the "XNOR" gate 33 equals 1.

A multiplexer 35 thereafter makes it possible to select the output of the "OR" gate 34 or of the "XNOR" gate 33. Said multiplexer is configured with an input signal PRE/EVAL. For example, the following convention may be used:
- during the pre-charge phase, PRE/EVAL takes the value 0 and the output of the "OR" gate 34 is transmitted as output from the multiplexer 35;
- during the evaluation phase, PRE/EVAL takes the value 1 and the output of the "XNOR" flip-flop 33 is transmitted as output from the multiplexer 35;

Consequently, the FAULT signal available at the output of the multiplexer 35 takes the value 1 when a non-consistent state is detected and remains at 0 otherwise.

So as to simplify the implementation of the method, detection may take place only during the evaluation phase, thus making it possible to reduce the complexity by requiring only one "XNOR" gate. Detection may also take place only during the pre-charge phase, thus making it possible to reduce the complexity by requiring only one "OR" gate. In both cases, the use of the multiplexer 35 is not required. The drawback of this reduction in complexity is that the chances of detecting an intrusion are reduced.

Figure 4:
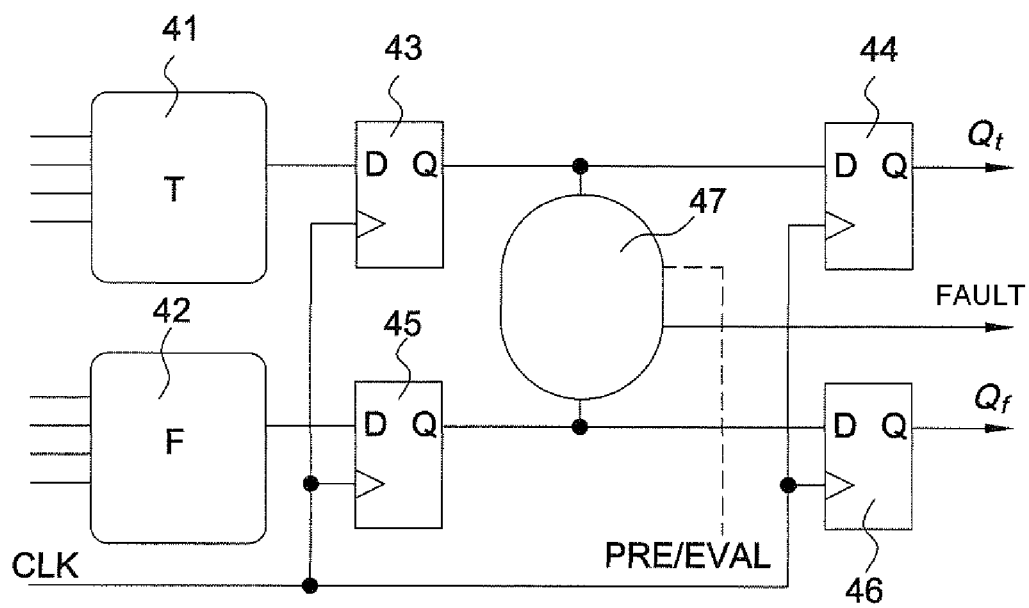
FIG. 4 presents an exemplary circuit using the method for detecting anomalies.

FIG. 4 presents an exemplary use of the method for detecting faults. The fault detection may be implemented within detection modules placed for example at the output of each dual gate composed of a network T 41 and of a network F 42 of a cryptography circuit. The cryptography circuit comprising said modules is implemented, for example, in an ASIC circuit or else in a programmable circuit of FPGA type.

Rather than placing the detection modules at the output of each dual gate, it is also possible, in order to reduce the complexity of the circuit, to implement said modules solely at the significant nodes of the circuit. A so-called "significant" node of the circuit is a node that is situated at the output of registers, such as D flip-flops 43, 45 for example, so as to be sure of the stability of the signals monitored by the detection module. Thus, in the example of FIG. 4, the detection is performed at the output of a network of cells T 41 and of a network of cells F 42. The detection module 47 is positioned between two pairs of registers 43, 45 and 44, 46 composed of D flip-flops. Each calculation phase then corresponds to a clock period. An encryption circuit using differential logic comprises a large number of nodes. The signal PRE/EVAL makes it possible to configure each module of the circuit for fault detection during the pre-charge phase or the evaluation phase. A FAULT signal at the output of each module 47 makes it possible to know whether an anomaly, that is to say a non-consistent state, has been detected at the level of each monitored node.

Figure 5:
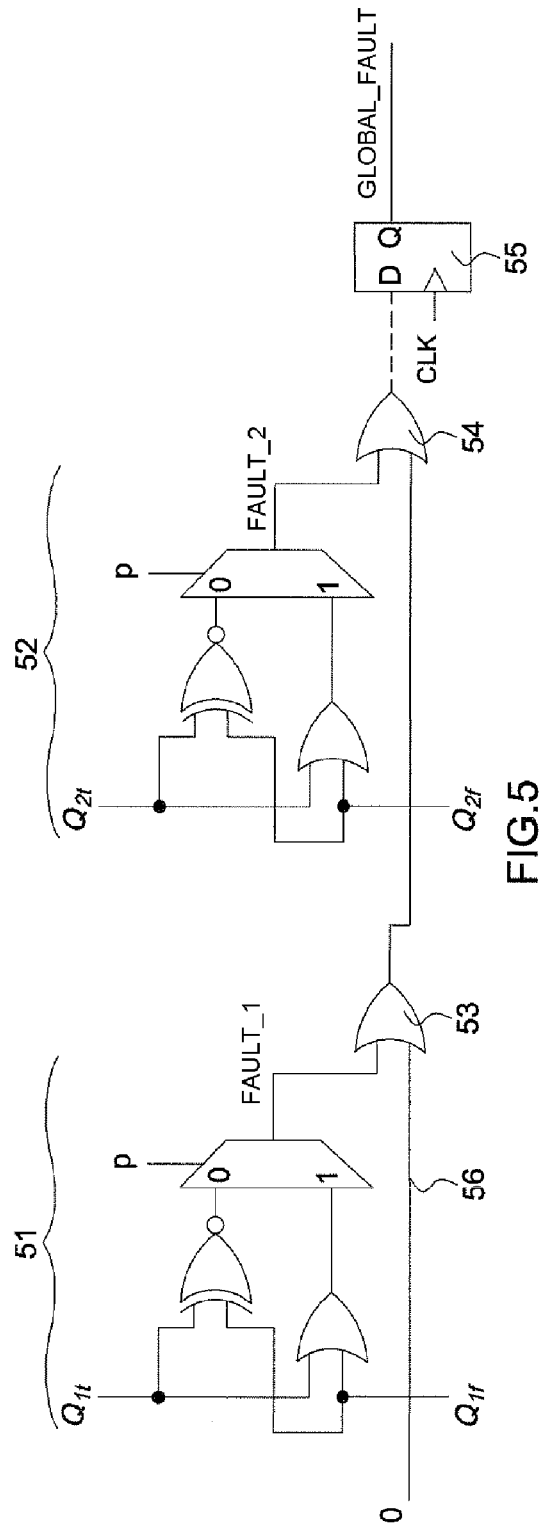
FIG. 5 presents a first exemplary chain for detecting anomalies.

FIG. 5 presents an exemplary chain for detecting anomalies. As described previously, detection modules may be placed in an encryption circuit using a differential-logic architecture, doing so at the level of each of the nodes to be monitored. One way of collecting the anomalies is to chain the detectors together. This technique exhibits the benefit of having only one equipotential 56 between the gates where the detection is done and thus facilitates the routing in the ASICs or FPGA. Thus the FAULT signals of the detection modules 51, 52 are chained together using "OR" gates 53, 54.

The output signals of the detection modules are chained as far as a flip-flop 55 collecting the global state of the system so as to enhance the reliability of the global output signal GLOBAL_FAULT. Said signal takes the value 1 if at least one fault has been detected by one of the detection modules present in the chain.

If it turns out that the chain exhibits a critical path limiting the global operating speed of the protected processor, a pipeline register may be inserted. It is nonetheless necessary to ensure that the latency of the detection does not allow the attacker to recover the result of the calculation before anomaly detection.

Figure 6:
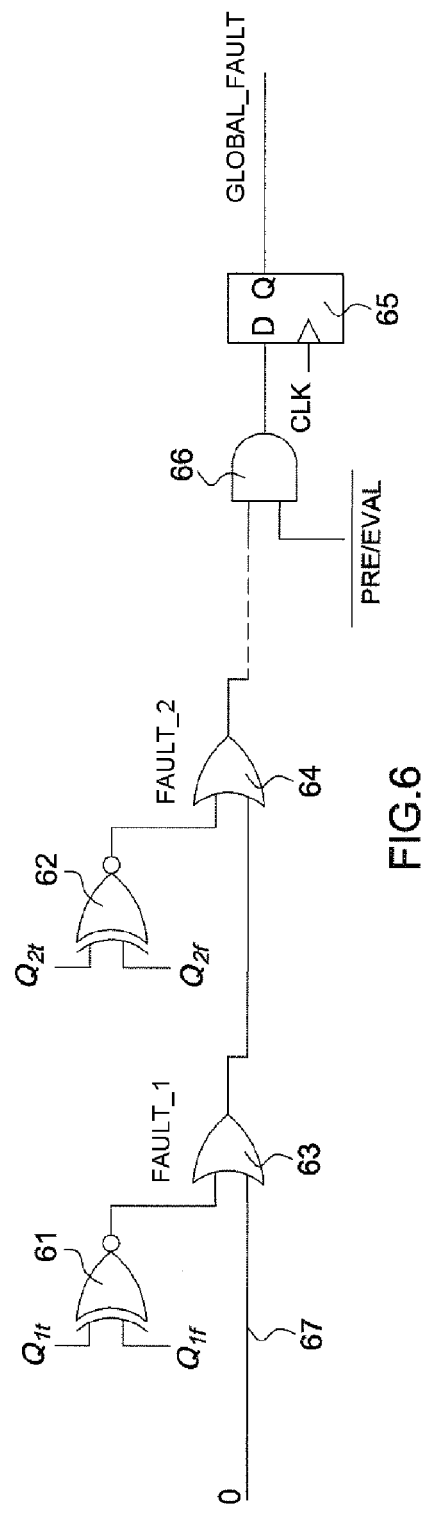
FIG. 6 presents a second exemplary chain for detecting anomalies.

FIG. 6 presents a second exemplary chain for detecting faults. To reduce complexity, a single chain may be used. For example, the detection modules may be simplified with respect to those of FIG. 5 and be reduced to an "XNOR" gate 61, 62. In this case, the detection of non-consistent states is valid only during the evaluation phase. So as to ignore the result of the detection modules during the pre-charge phase, an "AND" gate 66 makes it possible to take account of the result of the fault detection of each of the detection modules of the chain only when the signal $\overline{\text{PRE/EVAL}}$ is at 1. The FAULT signals of the detection modules 61, 62 are chained together using "OR" gates 63, 64. The anomalies detected by the chained detection modules are transmitted on an equipotential 67 as far as a flip-flop 65 collecting the global state of the system so as to enhance the reliability of the global output signal GLOBAL_FAULT. Said signal takes the value 1 if at least one fault has been detected at one of the nodes of the chain.

As claimed in the same principle, the detection modules may be simplified so as to detect the non-consistent states solely during the evaluation phase. In this case, "OR" gates are used in place of the "XNOR" gates 61, 62 of FIG. 6 and the signal $\overline{\text{PRE/EVAL}}$ used as input to the "AND" gate 66 is replaced with the signal PRE/EVAL so as to take account of the result of the global detection only during the evaluation phase, i.e. when the signal PRE/EVAL takes the value 1.

It is also possible to use two independent chains, one for detecting the non-consistent states in the pre-charge phase and the other for detecting the non-consistent states in the evaluation phase, this making it possible to circumvent the use of multiplexers.

Figure 7:
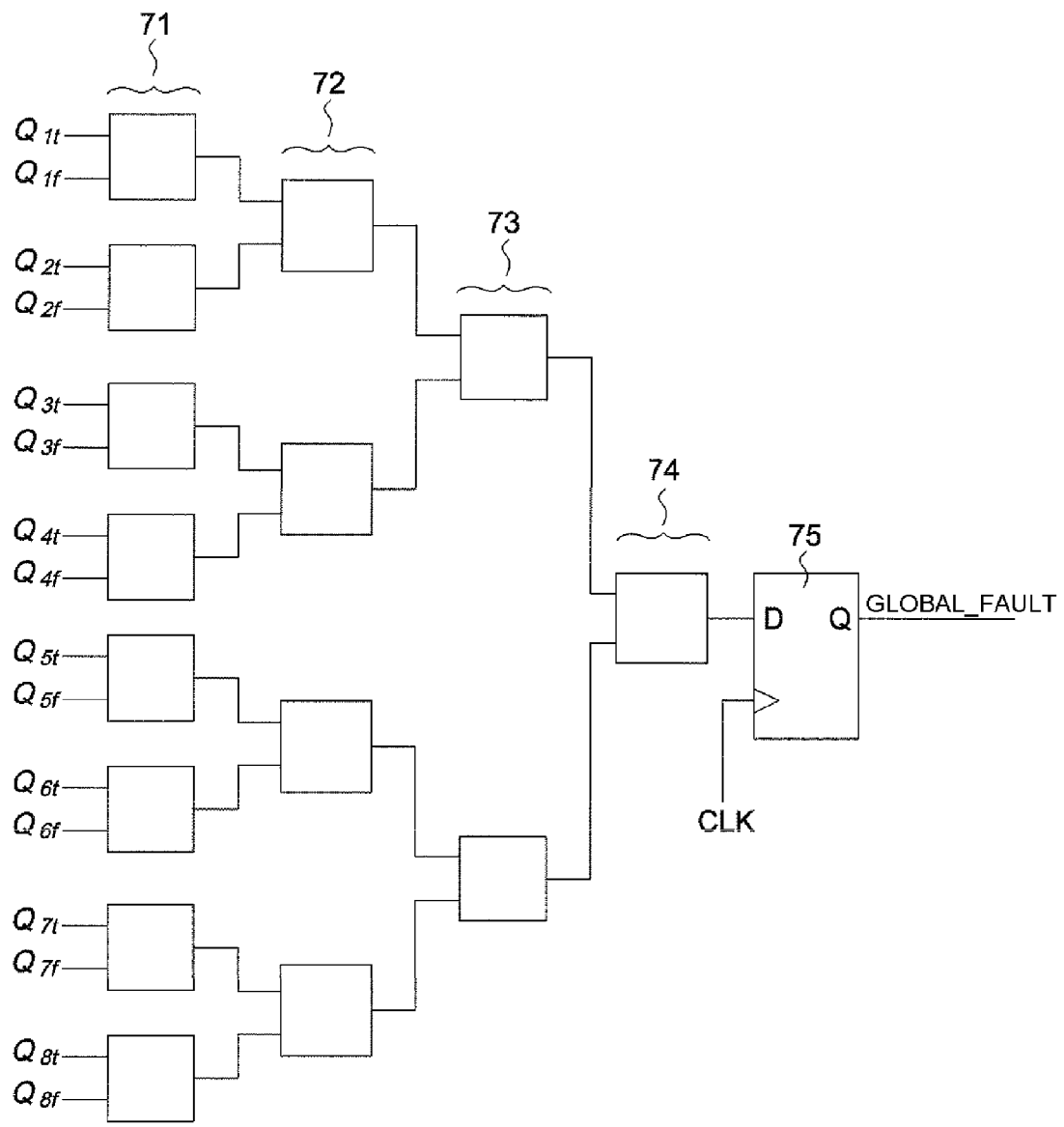
FIG. 7 presents an exemplary tree structure for the detection of anomalies.

FIG. 7 presents an exemplary tree structure for the detection of faults. Indeed, in order to accelerate the detection path, the detection modules may be structured as a tree. The example of FIG. 7 gives an example where the detection of non-consistent states is performed on eight nodes of a circuit protected by differential logic. The states of the pairs $(Q_{1t}, Q_{1f})$, $(Q_{2t}, Q_{2f})$, . . . , $(Q_{8t}, Q_{8f})$ are monitored by virtue of detection modules 71 such as those described with the aid of FIGS. 3 and 4 and are positioned at the level of each of said nodes. The result of the detection by each of the modules is thereafter transmitted to a second bank of detection modules 72 whose outputs are themselves transmitted to a third bank of detection modules 73. Ultimately, a last detector 74 generates a result signal for the global detection of the non-consistent states on the eight nodes monitored. A flip-flop 75 collects the global state of the system so as to enhance the reliability of the GLOBAL_FAULT output signal.

Figure 8:
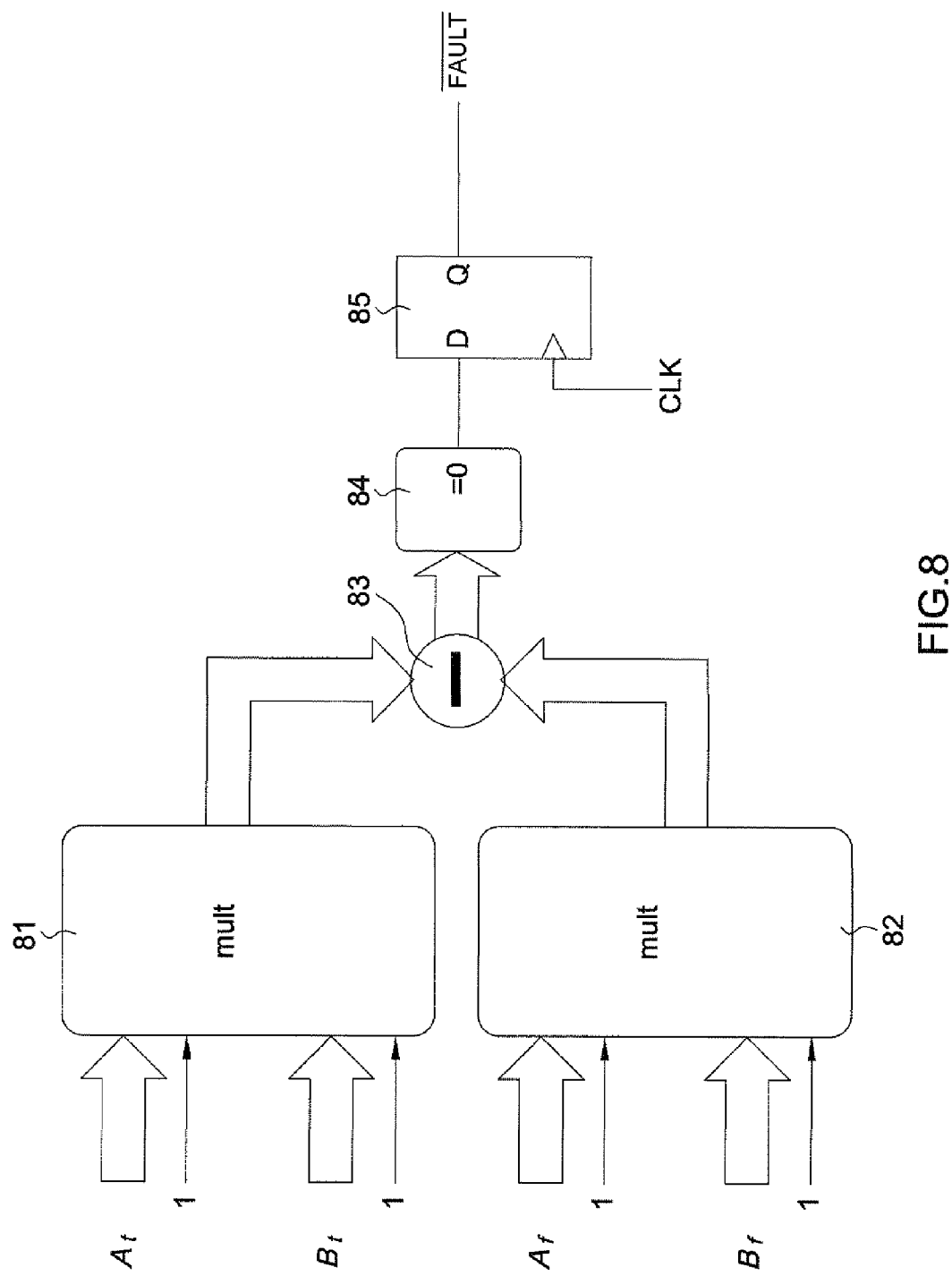
FIG. 8 presents an exemplary use of the method in a circuit using multiplication-accumulation blocks.

FIG. 8 presents an exemplary use of the method in a circuit using multiplication-accumulation blocks. Indeed, detection may be simplified by using multiplication-accumulation blocks, generally called MAC blocks, the acronym standing for "multiplication and accumulation". These blocks are for example available in certain FPGA circuits. The input signals are in this case made up by two pairs of words of N bits $A=(A_t, A_f)$ and $B=(B_t, B_f)$. $A_f$ and $B_f$ are the duals of $A_t$ and $B_t$ and are therefore expressed in the following manner as claimed in the two's complement representation of signed integers:

$$A_f = -A_t - 1 \quad (5)$$

$$B_f = -B_t - 1 \quad (6)$$

The product $A_t \times B_t$, is calculated in the set of relative integers and must correspond to the product $(A_f+1) \times (B_f+1)$. A single fault can thus be detected if there is no correspondence between the two products.

In the case of multiple faults, cases may exist where the faults in A and B compensate one another and give the same products but these cases have very low probabilities of occurrence. Nonetheless, this integer multiplication calculation based on an algebraic invariant ensures significant coverage, and therefore constitutes an effective counter-measure against fault injection.

To use this principle, it is necessary not only to consider $A_f+1$ and $B_f+1$ and not $A_f$ and $B_f$, but it is necessary moreover that these variables are never zero so as to carry out the detection during both phases, pre-charge and evaluation. A simple way of satisfying these conditions is to append a low-order bit of value 1 to the four words $A_t$, $B_t$, $A_f$ and $B_f$.

Two MAC blocks 81, 82 are used. The first 81 takes as input a binary word of N bits $A_t$ to which is appended a low-order bit equal to 1 and a binary word of N bits $B_t$ to which is also appended a low-order bit equal to 1. The second MAC block 82 takes as input a binary word of N bits $A_f$ to which is appended a low-order bit equal to 1 and a binary word of n bits $B_f$ to which is also appended a low-order bit equal to 1. The results output by each of the blocks 81, 82 are compared by taking the difference between said results 83. This difference is zero when no anomaly is detected. A zero comparator 84 is consequently added so as to detect whether there is fault or not. The result of the comparator 84 is thereafter transmitted as input to a flip-flop 85 so as to enhance the reliability of the output signal. The signal FAULT output by the flip-flop remains at 1 when no anomaly is detected and takes the value 0 in the converse case.

The invention claimed is:

1. A non-transitory differential logic circuit configured to process pairs of first and second components, a component corresponding to a binary value, a pair of the first and second components being called a logic variable, a first network of cells carrying out logic functions on a first component of said pairs of first and second components, a second network of dual cells operating in complementary logic on a second component of said pairs of first and second components, wherein a first vector groups together the first components of the pairs of first and second components and a second vector groups together the second components of the pairs of first and second components, said differential logic circuit comprising:

two or more detection circuitry modules, each detection circuitry module comprising:
  two multiplier-accumulators configured to each append a binary value of one to each of the first vector and the second vector and to each perform multiplication-accumulation operations between the first vector and the second vector in response to the appending of the binary value of one to each of the first vector and the second vector, and
  a zero comparator configured to calculate the difference between results of the two multiplication-accumulation operations and to output a predefined value when a non-consistent state is detected in pre-charge or evaluation phases based on the calculation of the difference between the results of the two multiplication-accumulation operations.

2. The non-transitory differential logic circuit as claimed in claim 1, wherein the output of the zero comparator of the detection circuitry modules is connected to a flip-flop to generate a stable output (FAULT), in response to the detection of the non-consistent state.

3. The non-transitory differential logic circuit as claimed in claim 1, wherein each pair of cells perform logic functions in a pre-charge phase to place logic variables in a known state on input to the cells, followed by each pair of cells performing a calculation in an evaluation phase, said non-transitory differential logic circuit further comprising:
  a plurality of the detection circuitry modules placed at various nodes of the non-transitory differential logic circuit, wherein an anomaly corresponding to a non-consistent state arising during the pre-charge phase or the evaluation phase, each of the plurality of the detection circuitry modules producing an output signal indicating that an anomaly has been detected at a level of a node associated with the detection circuitry module; and
  means for combining said output signals to generate a global output signal having a state that indicates that a fault has been detected by at least one of the plurality of the detection circuitry modules.

4. The non-transitory differential logic circuit as claimed in claim 3, wherein the output signals of the plurality of the detection circuitry modules are collected by chaining, the collected output signals being centralized on at least one equipotential using OR gates.

5. The non-transitory differential logic circuit as claimed in claim 4, wherein an output of each detection chain is connected to a flip-flop triggered by a clock signal of the non-transitory differential logic circuit, the flip-flop generating the global output signal having a predefined value when at least one non-consistent state is detected by one of the plurality of the detection circuitry modules of the chain.

6. The non-transitory differential logic circuit as claimed in claim 3, wherein at least part of the plurality of the detection circuitry modules are organized as a tree, the last detection circuitry module generating the global output signal indicating whether at least one non-consistent state has been detected at one of the circuit nodes monitored by said plurality of the detection circuitry modules.

7. The non-transitory differential logic circuit as claimed in claim 3, wherein each detection circuitry module comprises a logic gate configured to detect non-consistent states arising during the pre-charge phase, the logic gate being an OR gate if the consistent state is (0,0) or an AND gate if the consistent state is (1,1).

8. The non-transitory differential logic circuit as claimed in claim 3, wherein each detection circuitry module comprises a logic gate XNOR configured to detect non-consistent states arising during the evaluation phase.

9. The non-transitory differential logic circuit as claimed in claim 3, wherein each detection circuitry module comprises a multiplexer configured to select a signal resulting from the detection of non-consistent states, an output of a gate configured to detect non-consistent states in the pre-charge phase being selected during the pre-charge phase and an output of a gate configured to detect non-consistent states in the evaluation phase being selected during the evaluation phase, the selection being controlled by a configuration signal.

10. The non-transitory differential logic circuit as claimed in claim 1, wherein the non-transitory differential logic circuit is a cryptography circuit.

11. The non-transitory differential logic circuit as claimed in claim 1, wherein the non-transitory differential logic circuit is a programmable circuit of FPGA type.

12. The non-transitory differential logic circuit as claimed in claim 1, wherein the non-transitory differential logic circuit is a circuit of ASIC type.

* * * * *